Patented Sept. 3, 1935

2,013,052

UNITED STATES PATENT OFFICE 2,013,052

PRODUCTION OF AROMATIC AMINES

George Frederick Horsley, Norton-on-Tees, England, assignor to Imperial Chemical Industries Limited, a corporation of Great Britain No Drawing. Application May 20, 1931, Serial No. 538,871. In Great Britain May 27, 1930

16 Claims. (Cl. 260—130.5)

This invention relates to the production of aromatic amines, and specifically by the treatment of phenolic compounds with ammonia or amines.

It is known that a reaction can be conducted between phenol ($C_6H_5OH$) and ammonia, for example, by heating phenol with aqueous ammonia in a sealed tube, but hitherto the aniline produced by this process has been in infinitesimal amounts. Various attempts have been made to improve the yield of aniline by working in the presence of added substances such as zinc chloride or ammonium chloride together with zinc oxide, but satisfactory results have not been obtained.

I have found that good yields of aromatic amines can be obtained by conducting the reaction between phenols and ammonia or amines at elevated temperatures and pressures in the presence of chlorides of metals which are capable of forming more than one chloride, such as, for example, metals which exhibit more than one valency toward chlorine. My invention may be illustrated but not limited by the following examples, in which the parts are by weight:

Example 1

1,000 parts of phenol ($C_6H_5OH$) were placed in a rotary autoclave, together with 50 parts of hydrated ferrous chloride ($FeCl_2, 4H_2O$), and a stream of dry ammonia was passed in at the ordinary pressure until the phenol had liquefied and had become saturated with ammonia. At this stage the ammonia was present in about equi-molecular proportion to the phenol. Liquid ammonia was then added to bring the total ammonia up to 433 parts and the autoclave was sealed and heated to 350° C. for a period of 12 hours, the pressure rising to 150 atmospheres. After cooling, the contents of the autoclave were transferred to a distillation vessel and caustic soda solution added to fix the remaining free phenol.

The liquid was then heated to expel ammonia and then distilled to isolate the aniline formed, which amounted to 550 parts. The reaction products also contained 15 parts of diphenylamine and 380 parts of unchanged phenol, the yield of aniline on the phenol used up being 89 per cent.

Example 2

1,000 parts of phenol were placed in a rotary autoclave, together with 50 parts of hydrated ferrous chloride, and a stream of dry ammonia was passed in at the ordinary pressure until 215 parts of ammonia had been absorbed. The autoclave was then sealed and heated to 380° C. for a period of 6 hours, the pressure rising to 96 atmospheres. The yield of aniline was 490 parts, of diphenylamine 90 parts and 325 parts of unchanged phenol were recovered. The yield of aniline on the phenol used up was 73 per cent.

Example 3

1,000 parts of phenol were placed in a rotary autoclave, together with 30 parts of anhydrous cuprous chloride, and 433 parts of ammonia were added. The autoclave was then sealed and heated to 380° C. for a period of 6 hours, the pressure rising to 160 atmospheres. The yield of aniline was 485 parts, of diphenylamine 10 parts and 460 parts of unchanged phenol were recovered. The yield of aniline on the phenol used up was 91 per cent.

Example 4

1,000 parts of o-cresol were placed in a rotary autoclave, together with 50 parts of anhydrous ferric chloride, and ammonia was passed in at the ordinary pressure until 175 parts of ammonia had been absorbed.

The autoclave was then sealed and heated to 380° C. for a period of 12 hours, the pressure rising to 120 atmospheres. The yield of o-toluidine was 480 parts and 400 parts of unchanged o-cresol were recovered, the yield of o-toluidine on the o-cresol used up being 82 per cent.

The catalysts employed in my improved process are preferably metal chlorides of metals which exhibit more than one valency toward chlorine, and which are freely soluble in water, preferably those which form solid hydrates. As examples of such compounds are the iron chlorides, cobalt chlorides, manganese chlorides, copper chlorides, tin chlorides and mixtures thereof. It will be understood that where I have defined the chlorides as, for example, iron chlorides, I intend to specify the chloride of both the ferrous and ferric iron. The same applies for the chlorides of the other metals illustrated hereabove.

My process is applicable to phenols of the benzene series generally, and where in the specification and claims I have used the expression "phenolic compounds" I intend to cover phenol and substituted phenols. Crude phenols, for example, tars or fractions thereof, may also be used. It is to be understood that the substituents which may be present in the phenolic compounds are those which do not react with amines or ammonia under the given conditions. The amines which may be used in accordance with my invention are primary and secondary aliphatic, alicyclic and aralkyl amines and primary aromatic amines. In addition, such secondary aromatic amines may be employed as do not contain more than one aryl group directly attached to the nitrogen. By way of illustration, compounds of the following type may be used:

in which R may be hydrogen, an alkyl, aralkyl, aryl or alicyclic nucleus, and R' may be hydrogen, an alkyl or aralkyl nucleus. By aralkyl is meant compounds in which the free bond is in the alkyl part of the nucleus, and by alicyclic is meant compounds in which the free bond is in the cyclic part of the nucleus.

The phenol may be mixed with the liquid or gaseous ammonia or amine in presence or absence of a solvent, or a gaseous amine or ammonia gas may be introduced under pressure. An amount of the metal chloride up to about 5% or more of the weight of the phenol is added, and the mixture is heated, preferably to 300° C.- 400° C., under pressure if necessary. Preferably the reaction is effected in the liquid phase and under a pressure of at least 50 atmospheres.

A suitable time of reaction is from 2 to 12 hours, and in general no better results are obtained by prolonging the reaction for more than 12 hours. The reaction can be brought about somewhat more rapidly by working at higher temperatures, but at temperatures above 380° C. loss of reaction products by charring is noticeable.

Since many embodiments of this invention, differing widely in one or more respects, may be made without departing from the spirit of my invention, it is to be understood that I do not limit myself to the foregoing examples or description except as indicated in the following claims:

I claim:

1. In a process of producing aromatic amines by replacing the hydroxyl radical of a phenol of the benzene series with an amino radical, the step which comprises inter-acting a non-halogenated phenolic compound of the benzene series with a compound of the type:

in which R is a monovalent radical from the group consisting of hydrogen, alkyl, aralkyl, aryl or alicyclic nuclei, and R' is a monovalent radical from the group consisting of hydrogen, alkyl, and aralkyl nuclei, in the presence of a chloride of a metal which is capable of forming more than one chloride.

2. The process of claim 1 in which the pressure is at least 50 atmospheres.

3. The process of claim 1 in which the temperature is at least 300° C.

4. The process of producing a phenylamine which comprises reacting a compound selected from the group consisting of phenol and alkyl phenols with substantially dry ammonia at a temperature of about 300° C. to about 400° C. under super-atmospheric pressure, in the presence of a chloride of a metal capable of forming more than one chloride, also capable of forming a solid hydrate and freely soluble in water.

5. In a process for the production of aromatic amines of the benzene series by replacing the hydroxyl radical of a phenol of the benzene series with an amino radical, the step which comprises reacting a non-halogenated phenol of the benzene series with ammonia in the presence of a chloride of a metal which is capable of forming more than one chloride.

6. The process of claim 5, in which the metal chloride is freely water-soluble and is capable of forming a solid hydrate.

7. The process claimed in claim 5 in which the metal chloride is an iron chloride.

8. The process claimed in claim 5 in which the metal chloride is a copper chloride.

9. The process claimed in claim 5 in which the reaction is conducted in the liquid phase and under a pressure of at least 50 atmospheres.

10. The process claimed in claim 5 in which the reaction is conducted at temperatures between about 300° and about 400° C.

11. The process claimed in claim 5 in which the ammonia is present in excess of that amount of ammonia theoretically required to react with the phenolic compound.

12. The process claimed in claim 5 in which the phenolic compound is ortho-cresol.

13. The process claimed in claim 5 in which the phenolic compound is present as a crude phenol.

14. In a process of producing aniline, the step which comprises reacting phenol with ammonia in the presence of a chloride of a metal which is capable of forming more than one chloride.

15. The process of producing aniline which comprises reacting phenol with an excess of substantially dry ammonia in the liquid phase at a temperature of about 350° C. to about 380° C. under a pressure of at least 50 atmospheres, in the presence of a copper chloride.

16. The process of producing aniline which comprises reacting phenol with an excess of substantially dry ammonia in the liquid phase at a temperature of about 350° C. to about 380° C. under a pressure of at least 50 atmospheres, in the presence of an iron chloride.

GEORGE FREDERICK HORSLEY.